United States Patent
Auslander et al.

(10) Patent No.: US 6,284,027 B1
(45) Date of Patent: Sep. 4, 2001

(54) MACHINE READABLE WATER BASED RED FLUORESCENT INK COMPOSITIONS

(75) Inventors: Judith A. Auslander, Westport; Richard A. Bernard, Norwalk; Claude Zeller, Monroe, all of CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/541,999

(22) Filed: Apr. 3, 2000

(51) Int. Cl.$^7$ .................................................. C09D 11/02
(52) U.S. Cl. ................................. 106/31.15; 106/31.58; 106/31.32; 106/31.49
(58) Field of Search ..................... 106/31.32, 31.58, 106/31.15, 31.49

(56) References Cited

U.S. PATENT DOCUMENTS 5,486,550 * 1/1996 Lubas ....................................... 523/161

* cited by examiner

Primary Examiner—C. Melissa Koslow
Assistant Examiner—Veronica F. Faison
(74) Attorney, Agent, or Firm—Ronald Reichman; Michael E. Melton

(57) ABSTRACT

An ink composition suitable for printing machine readable indicia on a substrate with an ink jet printing device is disclosed. The disclosed ink composition comprises water, a water soluble resin, a red fluorescent colorant material mixture comprising C.I. Basic yellow 40 dye, C.I. Basic Red 1 dye, and C.I. Basic Violet 11:1 dye, and a blue colorant material comprising C.I. Acid Blue 9. In the preferred embodiments of the ink composition, the dyes in the red fluorescent colorant material mixture are present in a weight ratio of approximately 1.12 to 1.36 to 1, respectively, and the weight ratio of the red fluorescent colorant material mixture to the blue colorant material is in the range of about 3.8 to 1 to about 46 to 1.

10 Claims, 2 Drawing Sheets

MACHINE READABLE WATER BASED RED FLUORESCENT INK COMPOSITIONS

TECHNICAL FIELD

The present invention relates generally to ink compositions. More particularly, the present invention relates to water based red fluorescent ink composition having suitable fluorescent and optical properties in the visible wavelengths for printing machine and human readable indicia with an ink jet printer.

BACKGROUND OF THE INVENTION

In the machine processing of various types of tickets, tags, labels, postage imprints and the like, it is generally known to employ detectors which are responsive to colors, and in many cases to the fluorescent emissions of an ink which may be the result of ultraviolet light excitation. Fluorescent inks and dyes and methods of making the same have long been known as disclosed in U.S. Pat. Nos. 2,681,317; 2,763,785; 3,230,221; 3,421,104; 3,452,075; 3,560,238; and 4,015,131. It is known, for example, in the postage meter art to provide a red fluorescent ink for the machine reading of processed mail. Fluorescent colored inks are those in which the ink exhibits a first color, such as blue, black or green, in the visible spectrum and a second color when subjected to ultraviolet light.

Although the inks and dyes used previously for the purposes described above have worked relatively well, certain drawbacks exist. With regard to fluorescent inks, prior fluorescent inks were dispersion inks that experience frequent color separation upon aging. In addition, the prior red fluorescent inks with non-red visual color generally have dull visual colors. It is difficult to obtain a red fluorescent ink with a non-red visual color in solution because of interaction between the dyes that causes the non-red visual color to absorb the fluorescence of the image. This is known as quenching and is occasioned by many factors such as internal conversion, competing mechanisms, absorption of incident light by foreign molecules, solvent interaction, and the like. The quenching effect is obvious with the blue dyes that absorb light between 600–640 nm which is the emission range of the red fluorescent dye.

As generally stated above, machine readable red fluorescent inks have been used in postage meters or franking machines for imprinting postal indicia on a variety of substrates. In the United States, the inks used for printing postal indicia on substrates need to be red fluorescent so that automatic sorting equipment used by the United States Postal Service, which requires inks with red fluorescent characteristics, will perform properly.

The excitation wave length of a typical red fluorescent ink is 254 nm while the emission radiation of the typical ink is typically in the range of 580–640 nm. Postal indicia printed on a typical substrate such as an envelope or label with red fluorescent inks have to have good water fastness, good smear fastness and light fastness. Also, postal indicia printed on various different substrates have to have sufficient contrast properties to enable the indicia to be efficiently detected by the automatic sorting equipment.

Postal indicia or franking machines have been developed that use digital printing technology to permit the use of variable information on the postal indicia and to provide more enhanced printing, resulting in better indicia print quality. Better print quality of the postal indicia enables the postal indicia to be more efficiently read by optical character recognition equipment, bar code readers and other types of machine vision technology typically used in automatic sorting machines and the like. In other words, poor print quality will generally cause Postal Service equipment to erroneously reject postal indicia resulting in increased cost to the Postal Service in the processing of mail.

The use of digital printing technology for printing and franking is restricted, to some extent, by the limited existence of inks that are suitable for franking, and at the same time, are functional with specific ink jet technology. Some magenta inks meet the above criteria. The choice of the magenta dyes is narrow and some of the most brilliant available magenta dyes are fluorescent. One of the few available water soluble magenta dyes is the Acid Red 52. The Acid Red 52 dye has satisfactory solubility in water but a very low water fastness. Thus, a disadvantage of the magenta Acid Red 52 dye is that the ink containing such dye bleeds when exposed to water. Another disadvantage of using current magenta inks is that prints obtained with these inks offset on the back of neighboring envelopes when exposed to water, and the offset prints show an increased fluorescent signal. The dilution of fluorescent imprints on certain envelopes could enhance the fluorescent signal. Therefore, current magenta inks experience back ground offset fluorescence. This causes matter that is not an indicia to appear as an actual indicia printed on an envelope. The above causes Postal Service equipment to erroneously reject postal indicia. Thus, the above effect can cause increased cost to the Postal Service.

Another disadvantage of prior art piezoelectric ink jet inks, which are water-fast, is that the inks use different organic solvents instead of water. Various organic solvents, such as tripropylene glycol methyl ether or other glycol ethers, are used to improve the water fastness. The reason for the above is that the solvents dissolve or disperse colorants that are insoluble in water. Due to safety and compatibility requirements, with various plastic materials used in ink jet print heads, water is nevertheless desirable as the main solvent. The reason why water is desirable as a solvent when plastic materials are used is that water is much less aggressive than the organic solvents. The widely used plastic materials for ink jet printer parts are inker foam, cartridge material, glue, printer base, etc. The above parts may be made for example from acrylonitrile styrene (AS), polymethyl methacrylate (PMMA), and acrylonitrile butadiene styrene (ABS). Therefore, the disadvantage of using organic solvents is that they act as a solvent towards the plastic materials, thereby compromising their strength and causing a potential printer failure. Water is desirable as the main solvent in the ink composition because the plastic ink jet printer components are not soluble therein.

If a fluorescent ink is to be used in an ink jet printer, the fluorescent ink must have certain physical properties, such as a certain viscosity and a specified surface tension. The viscosity of the liquid inks used in current piezoelectric ink jet printers is 1.5–20 centipose (cps) and in the thermal ink jet printer is lower (1–5 cps). The desirable surface tension of liquid ink jet printer inks should be between 30–45 dynes/cm. A disadvantage of current water based ink jet inks is that the ink has a tendency to dry in the nozzles of the printer during operation of the printer and between operations of the printer. One of the properties of an ink that is used in an ink jet printer is the decap time, which is the length of time over which an ink remains fluid in a nozzle opening when exposed to air and capable of firing a drop. Precipitation of the solid in the ink can cause failure or coagulation in the ink and is often due to evaporation of the solvent causing precipitation or crystallization of a solid in the ink at the air/liquid surface. Another disadvantage of the water based inks is that they have to use "naked" (pure) dyes without resins in order to achieve good solubility. The dyes should be preferably direct, acid, basic or reactive. If the solubility of the colorant material in the solvent is not good enough, the drops stability, and the print quality tend to be poor. The long term solubility which affects the shelf life depends on the colorant's solubility in the solvent in various environmental conditions of temperature and humidity. The dyes that exhibit good water solubility suffer from deficiency in water fastness and smear fastness on the generated prints. The foregoing occurs because of the print's solubility in water.

Another disadvantage of dye based inks is that they produce prints with high edge roughness and poorly defined characters which is also called feathering. The foregoing disadvantage is more apparent at lower resolutions such as 240 dpi, where there is less overlap between the dots. Therefore, pigments which are insoluble in water are a preferred alternative to dyes provided that pigments dispersions can be made stable to sedimentation and gelling. The problem of using pigments is that they exhibit fragile equilibrium in dispersion. The dispersions are easily destabilized by changes in temperature, humidity and impurities. Other typical liquid ink properties are the inks ability to penetrate paper and to dry fast by absorption.

Another problem with fast penetrating inks is that the optical density decreases with the ink penetration. The above effect has to be compensated for in order to achieve good print quality. Good print quality may be achieved by using dyes with high absorbency values. This can have an adverse effect on the fluorescent signal (lowering the signal) of the prints due to quenching.

Another problem of prior art inks is that they do not give consistent print quality on a large variety of substrates. Postage meter inks have to be used on a large variety of paper envelopes. The components of the paper can be inhibiting for the fluorescence or can have adverse effects on the optical density of the prints. The wax based inks, such as hot melt ink, do not interact with the paper in the same manner as the liquid inks.

Therefore, there is a need for an ink composition that will have consistent fluorescence and provide an adequate print contrast signal on a broad range of substrates in the sensitivity wavelength range typical of common monochrome scanners.

SUMMARY OF THE INVENTION

The present invention is a water based ink composition suitable for printing machine readable indicia having sufficient print contrast ratio when viewed through a red filter and sufficient fluorescence on a broad range of substrates when printed with an ink jet printing device. The composition comprises water, a water soluble resin, a red fluorescent colorant material mixture comprising C.I. Basic Red 1 dye, C.I. Basic Yellow 40 dye, and C.I. Basic Violet 11:1 dye; and a blue colorant material comprising a spectral sensitizer class of dye, such as Acid Blue 9 ($C_{37}H_{34}N_2N_{a2}O_9S_3$). Organic solvents and penetrants may also be included in the composition.

DETAILED DESCRIPTION

Figure 1:
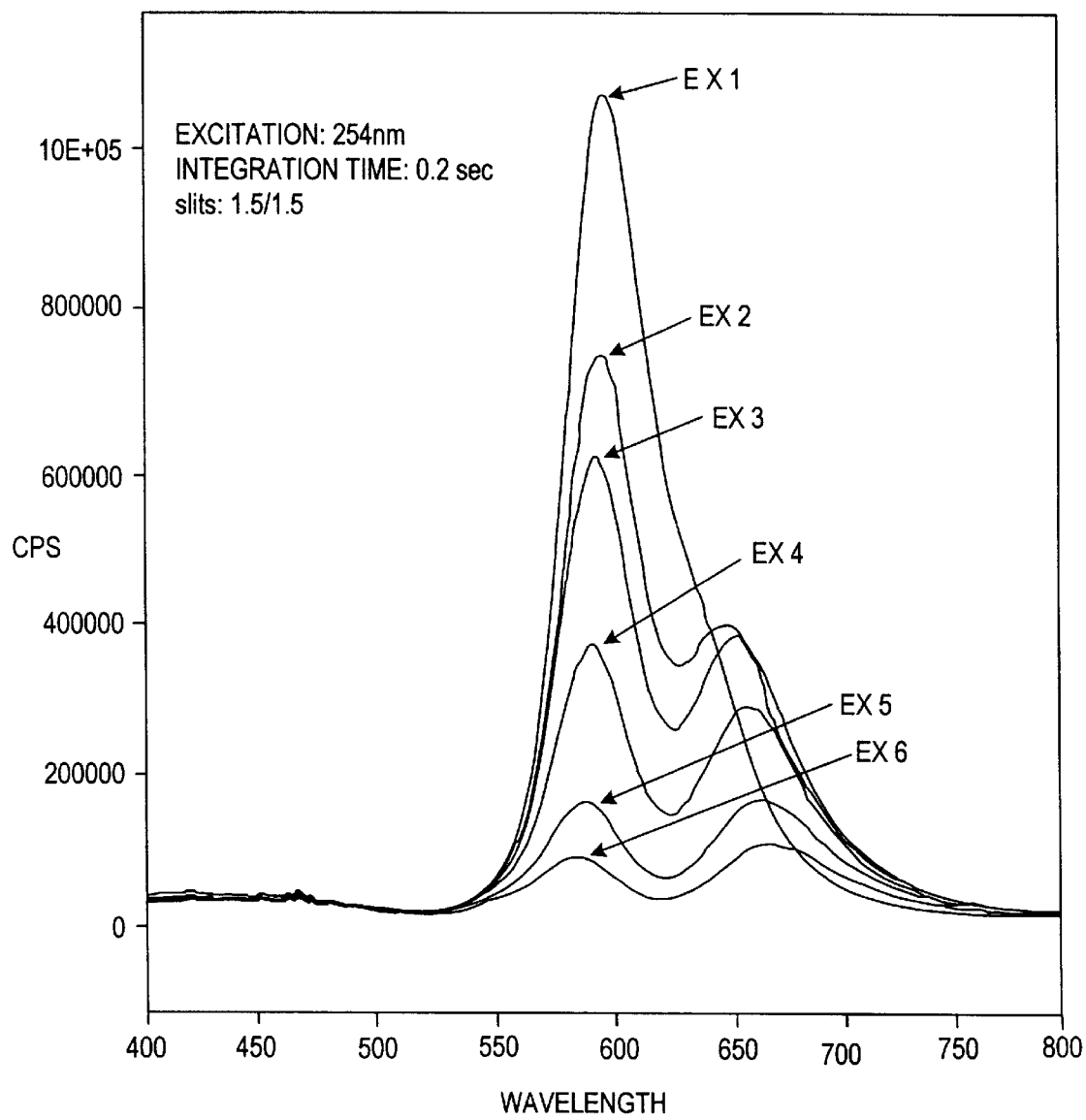
FIG. 1 shows a graphical plot of fluorescent intensity versus wavelength comparing compositions of Examples 2 through 6 made according to the present invention with the reference composition of Example 1.

The present invention is directed to fluorescent ink compositions which can be used in a commercially available ink jet printer, or the ink jet printer of a postage metering system, to print information based indicia, such as postage, on a substrate, such as an envelope. The ink composition of this invention is suitable for use in any ink jet printer or any drop on demand ink jet technology such as piezoelectric ink jet technology.

Generally, the inventive ink composition of the present invention includes a red fluorescent colorant material mixture formed by C.I. Basic yellow 40 dye, C.I. Basic Red 1 dye, and C.I. Basic Violet 1 1:1 dye for providing fluorescent optical characteristics to the ink. A blue colorant material, such as Acid Blue 9 dye, is provided in the ink composition to improve the optical density thereof at visible wavelengths while not substantially impairing the fluorescent properties of the composition. Acid Blue 9 is a dye belonging to the spectral sensitizer class and causes the red fluorescent colorant mixture to yield fluorescence at higher wave lengths, i.e., 590–680nm. The red colorant mixture and the blue colorant mixture are further combined with water, a water soluble resin, as well as one or more organic solvents, penetrants or other additives. Ink composition made according to the present invention will be further described below by way of examples.

Several optical characteristics of the ink compositions made according to the present invention as well as reference compositions to which such inventive ink compositions were determined. More particularly, optical characteristics such as fluorescent intensity (PMU) full window (26×20 mm), fluorescent intensity (PMU) in a 10 mm by 10 mm window, print reflectance difference (PRD) and print contrast ratio (PCR) with both red and green filters values were determined for the exemplary compositions described below.

To determine the contrast signal for an indicia printed on a substrate, a PRD test was devised. PRD is the difference between the reflectance of the unprinted part of the substrate and the reflectance of the printed part of the substrate, as measured with a United States Postal Service Envelope Reflectance (ER) Meter. The USPS ER meter has green and red light filters. The fluorescent intensity (PMU) values for all compositions hereinafter described were determined with Luminescence Meter, Model LM-2C made under contract for the United States Postal Service by RG Research Inc. The PMU versus wavelength for this composition, using an excitation wavelength of 254 nm, was measured with a Fluoromax-2 spectrometer made by J. V. Horiba.

EXAMPLE 1

A reference fluorescent dye composition with polyvinylpyrrolidone (weight average molecular weight of 10,000) as a water soluble resin for printing machine readable indicia with an ink jet printer was made by combining the following ingredients as indicated:

| INGREDIENT | (WT %) |
|---|---|
| Water | 58.3 |
| 2-pyrrolidone | 20.0 |
| Polyethylene Glycol | 12.0 |
| Triethylene Glycol Mono-n-butyl Ether | 7.00 |
| Polyvinylpyrrolidone (M.W. 10,000) | 1.50 |
| Basic Yellow 40 Dye ($C_{22}H_{24}N_3O_2+$) | 0.37 |
| Basic Red 1 Dye (C.I. No. 45160) ($C_{28}H_{31}N_2O_3+$) | 0.45 |
| Basic Violet 11:1 Dye (C.I. No. 45174) ($C_{29}H_{33}N_2O_3+$) | 0.33 |

The red and violet dyes were obtained from BASF located in Mount Olive, N.J., and the yellow dye was obtained from Pylam Products of Tempe, Ariz. This composition was drawn down onto a commercially available envelope using a K Control Coater 101 manufactured by RK Print-Coat Instruments Limited. The coating process is as described below. Spoil paper was placed on the coating bed of the apparatus to absorb excess ink. A substrate to be coated was placed on the spoil paper and held in place with a clip. The setting bar was pressed down firmly to assure that the bar was flat and evenly in contact with the substrate. A 0.8 mm diameter wire wound coating bar (#1) was placed in the coater. A 5.08 cm piece of cellophane tape was placed horizontally across the substrate just below the draw down bar. Using a pipette, about 1 mL of sample was placed down uniformly across the cellophane tape. The K control Coater was set to speed setting number 10 (12 meters per minute) and the bar was allowed to pass over the substrate to provide a uniform coating. The coated substrate was removed and allowed to dry.

The PMU full window, PMU 10 mm by 10 mm window, PRD and PCR values for the composition of Example 1 are set forth in Table 1. The fluorescent intensity (PMU) versus wavelength for this composition is represented by the curve designated as Ex. 1 in FIG. 1. As shown in FIG. 1, the fluorescent peak for this composition occurs slightly below 600 nm.

According to the present invention, to improve the print contrast signal (reduction in reflectance) of the water based ink composition set forth in Example 1, the ink composition was modified by the addition of a blue colorant material. The blue colorant material added to the reference composition was Acid Blue 9 dye. The Acid Blue 9 dye was added to the reference composition of Example 1 as a 1.00 weight percent solution of Acid Blue 9 obtained by combining 1 gram of Acid Blue 9 with 99 grams of water. To investigate the potential undesirable quenching effect of the addition of the blue colorant material on the fluorescence of the red fluorescent ink reference composition set forth in Example 1, the concentration of the blue colorant material was varied. Compositions containing different concentrations of blue colorant are described in Examples 2 through 6.

EXAMPLE 2

An ink composition containing 0.025 weight percent Acid Blue 9 was obtained by combining 1 gram of the 1.00 weight percent Acid Blue 9 solution with 39 grams of the fluorescent red ink composition described in Example SV filter and observed for evidence of precipitation. No precipitation was observed. The composition was drawn down on an envelope in the same manner described in Example 1. The PMU full window, PMU 10 mm by 10 mm window, PRD and PCR values for the red and green filters are set forth in Table 1. The fluorescent intensity (PMU) versus wavelength for this composition, using an excitation wavelength of 254 nm, was measured with the Fluoromax-2. A plot of the measurements made for this composition are represented by the curve designated as Ex. 2 in FIG. 1. As shown in FIG. 1, the fluorescent peak for this composition also occurs slightly below 600 nm, but in contrast to the curve for Example 1, a secondary peak appears slightly above 650 nm. Some fluorescent quenching is evident.

EXAMPLE 3

An ink composition containing 0.05 weight percent Acid Blue 9 was obtained by combining 1 gram of the 1.00 weight percent Acid Blue 9 solution with 19 grams of the fluorescent red ink composition described in Example 1. Once this composition was made, it was filtered as described in Example 2 and observed for evidence of precipitation. No precipitation was observed. The composition was drawn down on an envelope under the same process described in Example 1. The PMU full window, PMU 10 mm by 10 mm window, PRD and PCR values for the red and green filters are set forth in Table 1. The fluorescent intensity (PMU) versus wavelength for this composition, using an excitation wavelength of 254 nm, was measured with the Fluoromax-2. A plot of the measurements made for this composition are represented by the curve designated as Ex. 4 in FIG. 1. As shown in FIG. 1, a primary fluorescent peak for this composition also occurs slightly below 600 nm,, and similar to the composition of Example 2, and a secondary fluorescent peak appears slightly above 650 nm. The intensity of the secondary peak slightly above 650 nm relative to the primary peak slightly below 600 nm was greater for this composition than for the composition of Example 2. Greater fluorescent quenching is also shown.

EXAMPLE 4

An ink composition containing 0.10 weight percent Acid Blue 9 was obtained by combining 1 gram of the 1.00 weight percent Acid Blue 9 solution with 9 grams of the fluorescent red ink composition described in Example 1. Once this composition was made, it was filtered as described in Example 2 and observed for evidence of precipitation. No precipitation was observed. The composition was drawn down on an envelope under the same procedure previously described. The PMU full window, PMU 10 mm by 10 nm window, PRD and PCR values for the red and green filters are set forth in Table 1. The fluorescent intensity (PMU) versus wavelength for this composition, using an excitation wavelength of 254 nm, was measured with the Fluoromax-2. A plot of the measurements made for this composition are represented by the curve designated as Ex. 4 in FIG. 1. As shown in FIG. 1, the fluorescent peak for this composition also occurs slightly below 600 nm, but in contrast to the curve for Example 1, and similar to the composition of Examples 2 and 3, a secondary peak appears slightly above 650 nm. The intensity of the secondary peak slightly above 650 nm relative to the primary peak slightly below 600 nm was greater for this composition than for the compositions of Examples 2 and 3. Increased fluorescent quenching is also present.

EXAMPLE 5

An ink composition containing 0.20 weight percent Acid Blue 9 was obtained by combining 2 grams of the 1.00 weight percent Acid Blue 9 solution with 8 grams of the fluorescent red ink composition described in Example 1. Once this composition was made, it was filtered as described in Example 2 and observed for evidence of precipitation. No precipitation was observed. The composition was drawn down on an envelope under the same procedure. The PMU full window, PMU 10 mm by 10 mm window, PRD and PCR values for the red and green filters are set forth in Table 1. The fluorescent intensity (PMU) versus wavelength for this composition, using an excitation wavelength of 254 nm, was measured with the Fluoromax-2. A plot of the measurements made for this composition are represented by the curve designated as Ex. 5 in FIG. 1. As shown in FIG. 1, the fluorescent peak for this composition also occurs slightly below 600 nm, but in contrast to the curve for Example 1, and similar to the composition of Examples 2, 3 and 4, a secondary peak appears slightly above 650 nm. The intensity of the secondary peak slightly above 650 nm relative to the primary peak slightly below 600 nm was greater for this composition than for the compositions of Examples 2, 3 and 4. Additional quenching is evident.

EXAMPLE 6

An ink composition containing 0.30 weight percent Acid Blue 9 was obtained by combining 3 grams of the 1.00 weight percent Acid Blue 9 solution with 7 grams of the fluorescent red ink composition described in Example 1. Once this composition was made, it was filtered as described in Example 2 and observed for evidence of precipitation. No precipitation was observed. The composition was drawn down on an envelope as described above. The PMU full window, PMU 10 mm by 10 mm window, PRD and PCR values for the red and green filters are set forth in Table 1. The fluorescent intensity (PMU) versus wavelength for this composition, using an excitation wavelength of 254 nm, was measured with the Fluoromax-2. A plot of the measurements made for this composition are represented by the curve designated as Ex. 6 in FIG. 1. As shown in FIG. 1, the fluorescent peak for this composition also occurs slightly below 600 nm, but in contrast to the curve for Example 1, and similar to the composition of Examples 2, 3, 4 and 5, a secondary peak appears slightly above 650 nm. The intensity of the secondary peak slightly above 650 nm relative to the primary peak slightly below 600 nm was greater for this composition than for the compositions of Examples 2, 3, 4 and 5. The greatest quenching is shown.

TABLE 1

| Ex. No. | Acid Blue 9 Wt % | PMU 26 × 20 mm | PMU 10 × 10 mm | PRD Grn % | PCR Grn | PRD Red % | PCR Red |
|---|---|---|---|---|---|---|---|
| Ex. 1 | 0.00 | 99+ | 62 | 41 | .51 | 14 | .17 |
| Ex. 2 | 0.025 | 99+ | 35 | 42 | .53 | 19 | .23 |
| Ex. 3 | 0.05 | 90 | 25 | 43 | .54 | 26 | 32 |
| Ex. 4 | 0.10 | 55 | 15 | 45 | .54 | 30 | .37 |
| Ex. 5 | 0.20 | 25 | 7 | 43 | .54 | 36 | .45 |
| Ex. 6 | 0.30 | 14 | 4 | 41 | .51 | 44 | .55 |

To determine the effect, if any, of the polyvinylpyrrolidone water soluble resin in the composition, several compositions were made wherein 5,5 dimethylhydantoin polymer was substituted for polyvinylpyrrolidone. These compositions are described in Examples 7 through 12.

EXAMPLE 7

A reference fluorescent dye composition similar to the composition of Example 1 was prepared except that 5,5 dimethylhydantoin polymer was used instead of polyvinylpyrrolidone (weight average molecular weight of 10,000) as a water soluble resin. More specifically, the composition was made by combining the following ingredients as indicated:

| INGREDIENT | (WT %) |
|---|---|
| Water | 58.35 |
| 2-pyrrolidone | 20.0 |
| Polyethylene Glycol | 12.0 |
| Triethylene Glycol Mono-n-butyl Ether | 7.00 |
| 5,5 dimethylhydantoin polymer | 1.50 |
| Basic Yellow 40 Dye | 0.37 |
| Basic Red 1 Dye (C.I. No. 45160) | 0.45 |
| Basic Violet 11:1 Dye (C.I. No. 45174) | 0.33 |

Figure 2:
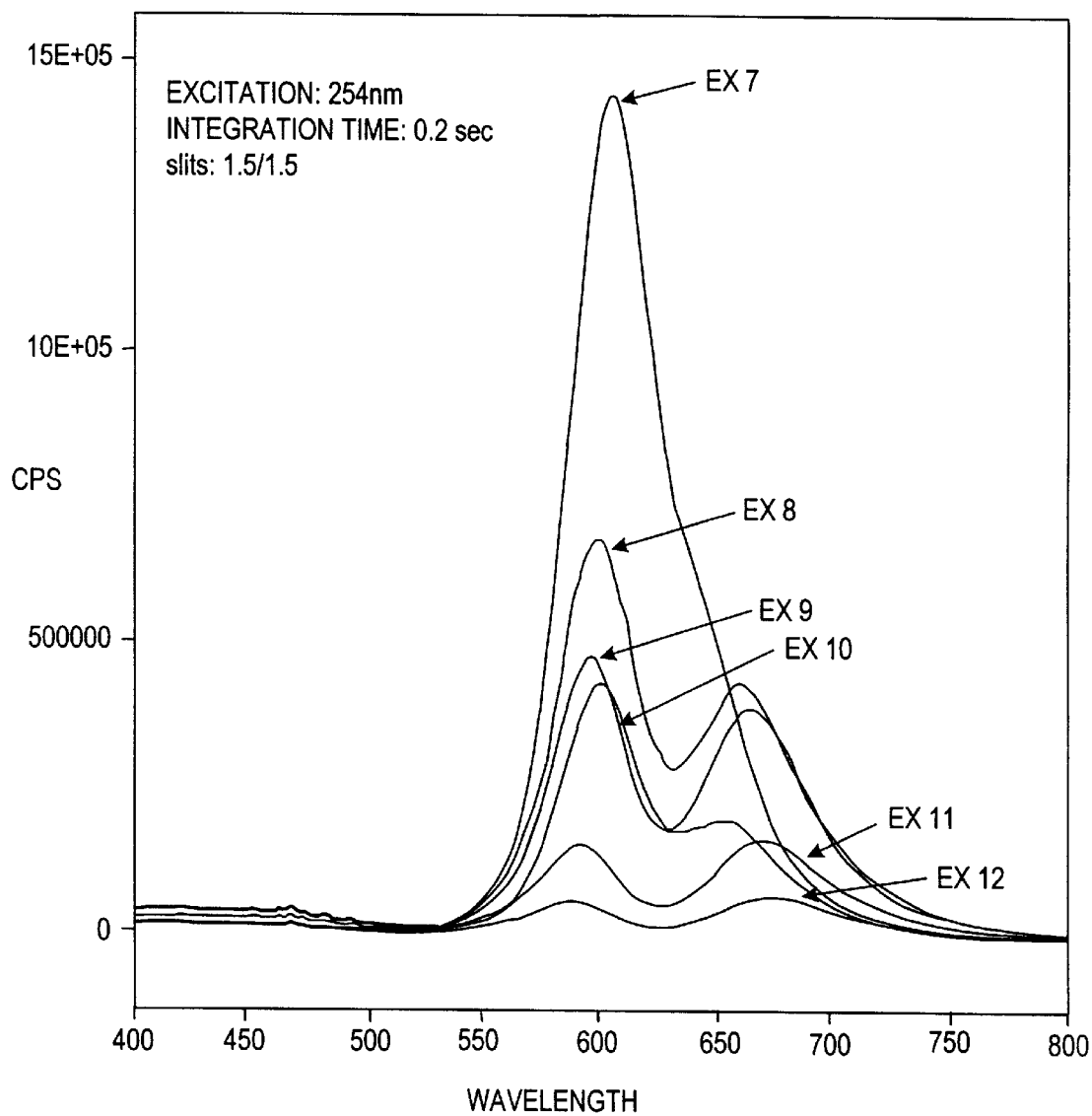
FIG. 2 shows a graphical plot of fluorescent intensity versus wavelength comparing compositions of Examples 8 through 12 made according to the present invention with the reference composition of Example 7.

This composition was drawn down onto a commercially available envelope using the K Control Coater 101 as described in Example 1. The optical density difference, PMU full window, PMU 10 mm by 10 mm window, PRD and PCR for the composition of Example 7 are set forth in Table 2. The fluorescent intensity (PMU) versus wavelength for this composition is represented by the curve designated as Ex. 7 in FIG. 2. As shown in FIG. 2, the fluorescent peak for this composition occurs slightly below 600 nm.

According to the present invention, to improve the print contrast signal (reduction in reflectance) of the water based ink composition set forth in Example 7, the ink composition was modified by the addition of the Acid Blue 9 blue colorant material solution. As in Examples 2 through 6 discussed above, to investigate the potential undesirable quenching effect of the addition of the blue colorant material on the fluorescence of the red fluorescent ink reference composition set forth in Example 7, the concentration of the blue colorant material was varied. Compositions containing different concentrations of blue colorant are described in Examples 8 through 12.

EXAMPLE 8

An ink composition containing 0.025 weight percent Acid Blue 9 was obtained by combining 1 gram of the 1.00 weight percent Acid Blue 9 solution with 39 grams of the fluorescent red ink composition described in Example 7. Once this composition was made, it was filtered as described in Example 2 and observed for evidence of precipitation. No precipitation was observed. The composition was drawn down on an envelope in the same manner described in Example 7. The PMU full window, PMU 10 mm by 10 mm window, PRD and PCR values for the red and green filters are set forth in Table 2. The fluorescent intensity (PMU) versus wavelength for this composition, using an excitation wavelength of 254 nm, was measured with the Fluoromax-2. A plot of the measurements made for this composition are represented by the curve designated as Ex. 8 in FIG. 2. As shown in FIG. 2, the fluorescent peak for this composition also occurs slightly below 600 nm, but in contrast to the curve for Example 7, a secondary peak appears slightly above 650 nm. Some fluorescent quenching is evident.

EXAMPLE 9

An ink composition containing 0.05 weight percent Acid Blue 9 was obtained by combining 1 gram of the 1.00 weight percent Acid Blue 9 solution with 19 grams of the fluorescent red ink composition described in Example 7. Once this composition was made, it was filtered as described in Example 2 and observed for evidence of precipitation. No precipitation was observed. The composition was drawn down on an envelope under the same process described in Example 7. The PMU full window, PMU 10 mm by 10 mm window, PRD and PCR values for the red and green filters are set forth in Table 1. The fluorescent intensity (PMU) versus wavelength for this composition, using an excitation wavelength of 254 nm, was measured with the Fluoromax-2. A plot of the measurements made for this composition are represented by the curve designated as Ex. 9 in FIG. 2. As shown in FIG. 2, a primary fluorescent peak for this composition also occurs slightly below 600 nm, and similar to the composition of Example 2, and a secondary fluorescent peak appears slightly above 650 nm. The intensity of the secondary peak slightly above 650 nm relative to the primary peak slightly below 600 nm was greater for this composition than for the composition of Example 2. Greater fluorescent quenching is also shown.

EXAMPLE 10

An ink composition containing 0.10 weight percent Acid Blue 9 was obtained by combining 1 gram of the 1.00 weight percent Acid Blue 9 solution with 9 grams of the fluorescent red ink composition described in Example 7. Once this composition was made, it was filtered as described in Example 2 and observed for evidence of precipitation. No precipitation was observed. The composition was drawn down on an envelope under the same procedure previously described. The PMU full window, PMU 10 mm by 10 mm window, PRD and PCR values for the red and green filters are set forth in Table 1. The fluorescent intensity (PMU) versus wavelength for this composition, using an excitation wavelength of 254 nm, was measured with the Fluoromax-2. A plot of the measurements made for this composition is represented by the curve designated as Ex. 10 in FIG. 2. As shown in FIG. 2, the fluorescent peak for this composition also occurs slightly below 600 nm, but in contrast to the curve for Example 7, and similar to the composition of Examples 8 and 9, a secondary peak appears slightly above 650 nm. The intensity of the secondary peak slightly above 650 nm relative to the primary peak slightly below 600 nm was greater for this composition than for the compositions of Examples 8 and 9. Increased fluorescent quenching is also present.

EXAMPLE 11

An ink composition containing 0.20 weight percent Acid Blue 9 was obtained by combining 2 grams of the 1.00 weight percent Acid Blue 9 solution with 8 grams of the fluorescent red ink composition described in Example 7. Once this composition was made, it was filtered as described in Example 2 and observed for evidence of precipitation. No precipitation was observed. The composition was drawn down on an envelope under the same procedure. The PMU full window, PMU 10 mm by 10 mm window, PRD and PCR values for the red and green filters are set forth in Table 1. The fluorescent intensity (PMU) versus wavelength for this composition, using an excitation wavelength of 254 nm, was measured with the Fluoromax-2. A plot of the measurements made for this composition is represented by the curve designated as Ex. 11 in FIG. 2. As shown in FIG. 2, the fluorescent peak for this composition also occurs slightly below 600 nm, but in contrast to the curve for Example 7, and similar to the composition of Examples 8, 9 and 10, a secondary peak appears slightly above 650 nm. The intensity of the secondary peak slightly above 650 nm relative to the primary peak slightly below 600 nm was greater for this composition than for the compositions of Examples 8, 9 and 10. Additional quenching is evident.

EXAMPLE 12

An ink composition containing 0.30 weight percent Acid Blue 9 was obtained by combining 3 grams of the 1.00 weight percent Acid Blue 9 solution with 7 grams of the fluorescent red ink composition described in Example 7. Once this composition was made, it was filtered as described in Example 2 and observed for evidence of precipitation. No precipitation was observed. The composition was drawn down on an envelope as described above. The PMU full window, PMU 10 mm by 10 mm window, PRD and PCR values for the red and green filters are set forth in Table 1. The fluorescent intensity (PMU) versus wavelength for this composition, using an excitation wavelength of 254 nm, was measured with the Fluoromax-2. A plot of the measurements made for this composition is represented by the curve designated as Ex. 12 in FIG. 2. As shown in FIG. 2, the fluorescent peak for this composition also occurs slightly below 600 nm, but in contrast to the curve for Example 7, and similar to the composition of Examples 8, 9, 10 and 11, a secondary peak appears slightly above 650 nm. The intensity of the secondary peak slightly above 650 nm relative to the primary peak slightly below 600 nm was greater for this composition than for the compositions of Examples 8, 9, 10 and 11. The greatest quenching is shown.

TABLE 2

| Ex. No. | Acid Blue 9 Wt % | PMU Full | PMU 10 × 10 mm | PRD Grn % | PCR Grn | PRD Red % | PCR Red |
|---|---|---|---|---|---|---|---|
| Ex. 7 | 0.00 | 99+ | 66 | 40 | .50 | 13 | .16 |
| Ex. 8 | 0.025 | 99+ | 37 | 42 | .53 | 20 | .29 |
| Ex. 9 | 0.05 | 90 | 26 | 42 | .53 | 24 | .30 |
| Ex. 10 | 0.10 | 55 | 16 | 43 | .54 | 30 | .37 |
| Ex. 11 | 0.20 | 25 | 6 | 43 | .54 | 35 | .43 |
| Ex. 12 | 0.30 | 14 | 4 | 43 | .54 | 40 | .50 |

As those skilled in the art will now appreciate, the ink compositions of the present invention generally comprised water, water soluble organic solvents and penetrants, C.I. Acid Blue 9 dye as a blue colorant material, and a red fluorescent colorant material mixture formed by C.I. Basic Yellow 40 dye, C.I. Basic Red 1 dye, and C.I. Basic Violet 11:1 dye. The dyes in the red fluorescent colorant material mixture are present in a weight ratio of approximately 1.12 to 1.36 to 1, respectively. The red fluorescent colorant material mixture is present in the ink composition in the range of about 0.81 to 1.12 weight percent. The weight ratio of the red fluorescent colorant material mixture to the blue colorant material in the ink composition of the present invention is in the range of about 3.8 to 1 to about 46 to 1. The water soluble resin is present in the range of 0 weight percent to 1.5 weight percent.

The invention overcomes the disadvantages of the prior art by providing an ink compositions for printing indicia that fulfill the United States Postal Service requirements for franking and/or automation compatibility while being capable of use in an ink jet printer. The indicia printed with the ink compositions of the present invention can be read by current U.S. Postal Service optical character recognition equipment or bar code reading systems. The ink compositions of the present invention are non-toxic and inert to the typical materials used in an ink jet printer. The ink composition provide printed indicia which are permanent in terms of water and light fastness on a large variety of substrates.

The above embodiments have been provided by way of illustrative examples only. Other embodiments of the present invention will become apparent to those skilled in the art, from consideration of the detailed description. Accordingly, limitations on the present invention are to be found only in the claims.

What is claimed is:

1. A water based ink composition for use in an ink jet printer for printing machine readable indicia on a substrate, the composition comprising:
   water;
   a water soluble resin;
   a red fluorescent colorant material mixture comprising C.I. Basic Red 1 dye, C.I. Basic Yellow 40 dye, and C.I. Basic Violet 11:1 dye; and
   a blue colorant material comprising Acid Blue 9 dye.

2. The ink composition of claim 1, wherein the dyes in the red fluorescent colorant material mixture are present in a weight ratio of approximately 1.12 to 1.36 to 1, respectively.

3. The ink composition of claim 2, wherein the weight ratio of the red fluorescent colorant mixture to the blue colorant material is in the range of about 3.8 to 1 to about 46 to 1.

4. The ink composition of claim 3, wherein the red fluorescent colorant material mixture comprises approximately 0.81 to 1.12 weight percent of the ink composition.

5. The ink composition of claim 1, wherein the water soluble resin is selected from the group consisting of polyvinylpyrrolidone and 5,5-dimethylhydantoin polymer.

6. The ink composition of claim 1, wherein the water soluble resin comprises polyvinylpyrrolidone having a molecular weight in the range of about 3,500 to 10,000.

7. An ink composition for use in an ink jet printer for printing machine readable indicia on a substrate, the composition comprising:
   water;
   2-pyrrolidone;
   polyethylene glycol;
   triethylene glycol mono-n-butyl ether;
   a water soluble resin;
   a red fluorescent colorant material mixture comprising C.I. Basic yellow 40 dye, C.I. Basic Red 1 dye, and C.I. Basic Violet 11:1 dye; and
   a blue colorant material comprising C.I. Acid Blue 9.

8. The composition of claim 1, wherein the dyes in the red fluorescent colorant material mixture are present in a weight ratio of approximately 1.12 to 1.36 to 1, respectively.

9. The ink composition of claim 1, wherein the weight ratio of the red fluorescent colorant material mixture to the blue colorant material is in the range of about 3.8 to 1 to about 46 to 1.

10. The ink composition of claim 1, wherein the water soluble resin is selected from the group consisting of polyvinylpyrrolidone.

* * * * *